(12) United States Patent
Chang et al.

(10) Patent No.: US 8,259,242 B2
(45) Date of Patent: Sep. 4, 2012

(54) STEREOSCOPIC DISPLAY DEVICE

(75) Inventors: Chao-song Chang, Taipei (TW); Chen-chi Lin, Bade (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 370 days.

(21) Appl. No.: 12/762,325

(22) Filed: Apr. 17, 2010

(65) Prior Publication Data
US 2011/0176073 A1    Jul. 21, 2011

(30) Foreign Application Priority Data
Jan. 18, 2010  (TW) .............................. 99101226 A

(51) Int. Cl.
*G02F 1/1335* (2006.01)

(52) U.S. Cl. .......................................... 349/15; 349/96

(58) Field of Classification Search ...................... 349/15
See application file for complete search history.

(56) References Cited

U.S. PATENT DOCUMENTS

| 6,590,605 | B1 * | 7/2003 | Eichenlaub | 348/51 |
| 7,791,686 | B2 * | 9/2010 | Struyk | 349/74 |
| 2005/0212984 | A1 * | 9/2005 | Wu et al. | 349/15 |

FOREIGN PATENT DOCUMENTS

TW    M358316 U1    6/2009

* cited by examiner

*Primary Examiner* — Wen-Ying P Chen
(74) *Attorney, Agent, or Firm* — Cheng-Ju Chiang

(57) ABSTRACT

A stereoscopic display device is disclosed. The stereoscopic display device includes a backlight module, a first liquid crystal display panel, a first polarizer, a second liquid crystal display panel, a second polarizer, and a detachable polarizer. The backlight module has a light emitting side. The first polarizer, the first liquid crystal display panel, the detachable polarizer, the second liquid crystal display panel, and the second polarizer are disposed sequentially from the light emitting side. The detachable polarizer is detachably inserted. By designing arrangements of the first polarizer, the second polarizer, and the detachable polarizer, and by limiting the pixel scale relationship between the first liquid crystal display panel and the second liquid crystal display panel, various types of stereoscopic display technologies can be implemented according to the present invention.

15 Claims, 5 Drawing Sheets

STEREOSCOPIC DISPLAY DEVICE

TECHNICAL FIELD OF THE INVENTION

The present invention relates to a stereoscopic display device, and more particularly to a stereoscopic display device capable of displaying a plurality of stereoscopic display technologies.

BACKGROUND OF THE INVENTION

Current day technology for displaying stereoscopic images by utilizing liquid crystal display panels includes a multi-layer display (MLD) type and a barrier type.

The Multi-layer display type can be further categorized into two types of applications. Please refer to FIG. 1, which illustrates the first type of application of the multi-layer display in the prior art. The first type of application is called a depth-fused display. In the depth-fused display, an image being displayed by a front liquid crystal display panel 100 is the same as an image displayed by a rear liquid crystal display panel 110, and brightness of the image displayed by the front liquid crystal display panel 100 is different from brightness of the image being displayed by the rear liquid crystal display panel 110 so as to show consecutive depth perception. For example, when the brightness of the image being displayed by the front liquid crystal display panel 100 is greater than the brightness of the image being displayed by the rear liquid crystal display panel 110, human eyes will see an image fusion near the front liquid crystal display panel 100, such as a circular graph A in the drawing. In contrast, when the brightness of the image being displayed by the rear liquid crystal display panel 110 is greater than the brightness of the image being displayed by the front liquid crystal display panel 100, human eyes will see the image fusion near the rear liquid crystal display panel 110, such as a circular graph B in the drawing. That is, by controlling the brightness of the image being displayed by the front liquid crystal display panel 100 and the brightness of the image displayed by the rear liquid crystal display panel 110, the image fusion may be shown at any depth between the front liquid crystal display panel 100 and the rear liquid crystal display panel 110 and the image fusion looks stereoscopic in such manner.

The second type of application (not shown) of the multi-layer display type is composed of a front liquid crystal display panel and a rear liquid crystal display panel as well. The difference between the depth-fused display and the second type of application is that an image being displayed by the front liquid crystal display panel of the second type of application is different from an image being displayed by the rear liquid crystal display panel thereof. The rear liquid crystal display panel usually displays a background image, and the front liquid crystal display panel displays a foreground image. The stereoscopic images with layering effect may be shown by displaying the foreground image different from the background image. The second type of application may be designed to use two polarizers or designed to use four polarizers. In the design using two polarizers, the two polarizers are disposed at the outer side of the front liquid crystal display panel and the outer side of the rear liquid crystal display panel, respectively. Brightness of an image being displayed by the front liquid crystal display panel has to be greater than brightness of an image being displayed by the rear liquid crystal display panel, because the image being displayed by the front liquid crystal display panel will cover the image being displayed by the rear liquid crystal display panel in human eyes. If the brightness of the image being displayed by the rear liquid crystal display panel is greater than brightness of an image being displayed by the front liquid crystal display panel, the image being displayed by the front liquid crystal display panel will fail to cover the image being displayed by the rear liquid crystal display panel so as to generate perspective perception in human eyes.

In the design using four polarizers, the four polarizers are disposed at the inner sides and the outer sides of the front liquid crystal display panel and the rear liquid crystal display panel, respectively. The arrangement of the brightness of an image being displayed by the front liquid crystal display panel and the brightness of an image being displayed by the rear liquid crystal display panel is contrary to the design using two polarizers. That is, the brightness of the image being displayed by the rear liquid crystal display panel has to be greater than brightness of the image being displayed by the front liquid crystal display panel, because the required lights of the front liquid crystal display panel are provided by the rear liquid crystal display panel. Among the aforementioned four polarizers, the two polarizers that are disposed at the inner sides of the front liquid crystal display panel and the rear liquid crystal display panel (i.e. the two polarizers between front liquid crystal display panel and the rear liquid crystal display panel) may be simplified as one polarizer. That is, only one of the polarizer being disposed at the inner side of the front liquid crystal display panel and the polarizer being disposed at the inner side of the rear liquid crystal display panel is chosen. The polarizer that is disposed at the outer side of the front liquid crystal display panel and the polarizer that is disposed at the outer side of the rear liquid crystal display panel remain unchanged. As a result, the design using four polarizers may be simplified as the design using three polarizers.

Please refer to FIG. 2, which illustrates the barrier type of the stereoscopic display technology in the prior art. A backlight module 200 provides lights required by a liquid crystal display panel 210. Firstly, images are observed from two different angles. Then, the images from two different angles are divided into vertical strips in equal distance, respectively. Finally, the vertical strips of one image are interlaced and merged as one image, and the merged image is displayed in the liquid crystal display panel 210. Odd strips 212 of the merged image are provided for a left eye 230, and even strips 214 of the merged image are provided for a right eye 240. Slits 222 of an optical grating 220 are utilized for limiting the left eye to observe only the odd strips 212 of the merged image. Barriers 224 of the optical grating 220 are utilized for limiting the right eye to observe only the even strips 214 of the merged image. As a result, the merged image looks stereoscopic due to binocular parallax. It is noted that a length of one of the slits 222 of the optical grating 220 in the horizontal direction has to be smaller than a length of a pixel of the liquid crystal display panel 210 in the horizontal direction. If the length of one of the slits 222 of the optical grating 220 in the horizontal direction is equal to or longer than the length of the pixel of the liquid crystal display panel 210 in the horizontal direction, the slits 222 and the barriers 224 will fail to limit the images that is observed by the left eye and the right eye. Accordingly, the left eye and the right eye will fail to generate binocular parallax and therefore the merged image will not look stereoscopic. Please refer to FIG. 3, which illustrates the barrier type utilizing two liquid crystal display panel 300, 310 in the prior art. The upper liquid crystal display panel 300 displays slits and barriers as shown in FIG. 2 by controlling indium tin oxide (ITO) electrodes 302, 304. That is, the upper liquid crystal display panel 300 displays black and white strips, and these strips are vertical. The slits are displayed as the white strips, and the barriers are displayed as the black strips so as to function as the optical grating 220 in FIG. 2. The lower liquid crystal display panel 310 is utilized for interlacing displayed images for the left eye and the right eye.

Although the multi-layer display type and the barrier type can be implemented by using two liquid crystal display panels, a stereoscopic display device can only implement either the multi-layer display type or the barrier type. Accordingly, such the stereoscopic display panel lack of flexibility in application. Therefore, there is a need for a solution to the above-mentioned problem that a stereoscopic display device cannot implement the multi-layer display type and the barrier type.

SUMMARY OF THE INVENTION

A primary objective of the present invention is to provide a stereoscopic display device, which is capable of implementing a plurality of stereoscopic display technologies.

The stereoscopic display device according to the present invention includes a backlight module, a first liquid crystal display panel, a first polarizer, a second liquid crystal display panel, a second polarizer, and a detachable polarizer. The backlight module has a light emitting side. The first liquid crystal display panel is disposed at the light emitting side of the backlight module. The first polarizer is disposed at a side of the first liquid crystal display panel which faces the backlight module. The second liquid crystal display panel is disposed at a side of the first liquid crystal display panel which is opposite to the side which faces the backlight module. The second polarizer is disposed at a side of the second liquid crystal display panel which is opposite to a side of the second liquid crystal display panel which faces the backlight module. The detachable polarizer is detachably inserted between the first liquid crystal display panel and the second liquid crystal display panel. An absorption axis of the first polarizer is parallel to an absorption axis of the second polarizer. An absorption axis of the detachable polarizer is perpendicular to the absorption axis of the first polarizer and the absorption axis of the second polarizer. A pixel length of the second liquid crystal display panel in the horizontal direction is smaller than a pixel length of the first liquid crystal display panel in the horizontal direction.

The stereoscopic display device according to the present invention is capable of implementing the multi-layer display type and the barrier type by designing arrangements of the first polarizer, the second polarizer and the detachable polarizer, and by limiting the pixel scale relationship between the first liquid crystal display panel and the second liquid crystal display panel.

DETAILED DESCRIPTION OF THE INVENTION

Figure 4:
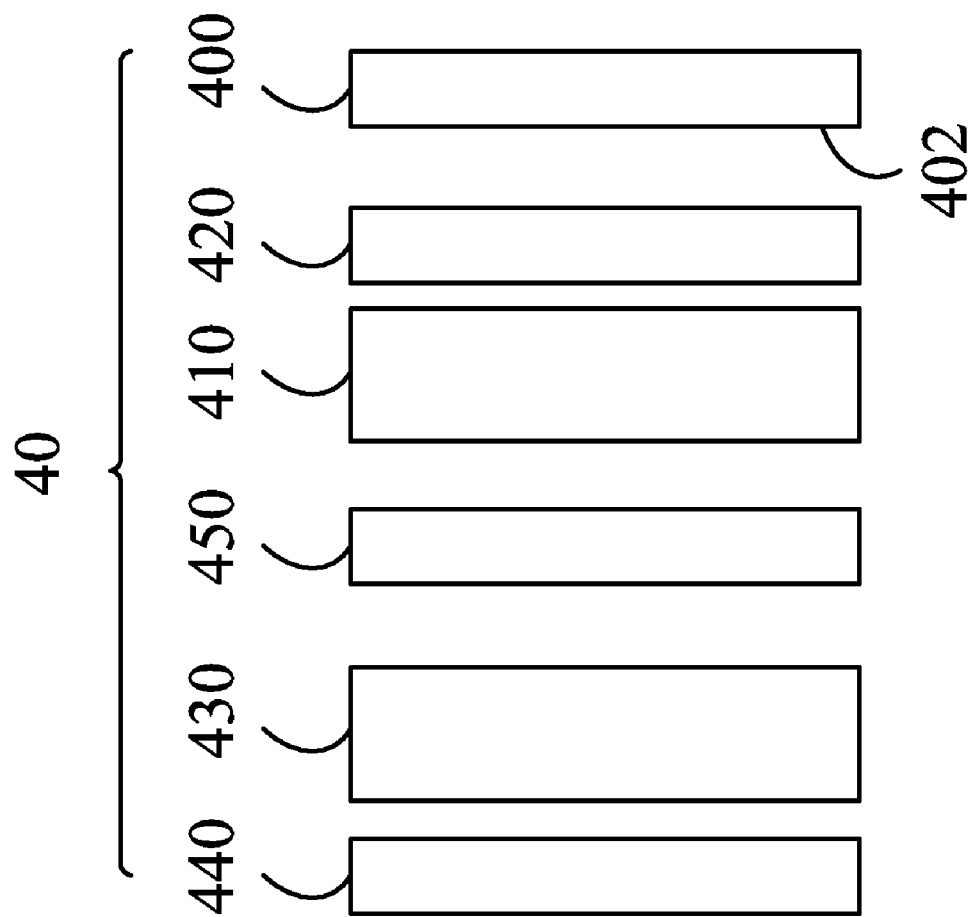
FIG. 4 illustrates a stereoscopic display device according to an embodiment of the present invention.
Figure 4:
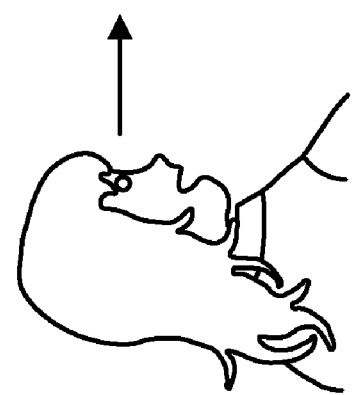

Please refer to FIG. 4, which illustrates a stereoscopic display device 40 according to an embodiment of the present invention. The stereoscopic display device 40 includes a backlight module 400, a first liquid crystal display panel 410, a first polarizer 420, a second liquid crystal display panel 430, a second polarizer 440, and a detachable polarizer 450.

The backlight module 400 has a light emitting side 402. The light emitting side 402 is utilized for providing lights required by the first liquid crystal display panel 410 and the second liquid crystal display panel 430. The first liquid crystal display panel 410 is disposed at the light emitting side 402 of the backlight module 400. The first polarizer 420 is disposed at a side of the first liquid crystal display panel 410 which faces the backlight module 400. That is, the first polarizer 420 is disposed between the first liquid crystal display panel 410 and the backlight module 400. The second liquid crystal display panel 430 is disposed at a side of the first liquid crystal display panel 410 opposite to the side which faces the backlight module 400. The second polarizer 440 is disposed at a side of the second liquid crystal display panel 430 which is opposite to a side of the second liquid crystal display panel 430 which faces the backlight module 400. The detachable polarizer 450 is detachably inserted between the first liquid crystal display panel 410 and the second liquid crystal display panel 430. An absorption axis (a direction for absorbing lights and preventing lights from passing through) of the first polarizer 420 is parallel to an absorption axis of the second polarizer 440. An absorption axis of the detachable polarizer 450 is perpendicular to the absorption axis of the first polarizer 420. That is, the absorption axis of the detachable polarizer 450 is also perpendicular to the absorption of the second polarizer 440. For example, the absorption axis of the first polarizer 420 and the absorption axis of the second polarizer 440 are in a vertical direction, and thus the absorption axis of the detachable polarizer 450 corresponds to be in a horizontal direction. A length of a pixel of the second liquid crystal display panel 430 in the horizontal direction is smaller than a length of a pixel of the first liquid crystal display panel 410 in the horizontal direction. This will be described in detail later. A length of the pixel of the second liquid crystal display panel 430 in the vertical direction is equal to a length of the pixel of the first liquid crystal display panel 410 in the vertical direction. In one preferred embodiment, the length of the pixel of the second liquid crystal display panel 430 in the horizontal direction is in a range from ⅓ to ½ of the length of the pixel of the first liquid crystal display panel 410 in the horizontal direction. That is, resolution of the first liquid crystal display panel 420 is in a range from twice to 3 times of resolution of the first liquid crystal display panel 410 when the first liquid crystal display panel 410 and the second liquid crystal display panel 430 have the same size. When the length of the pixel of the second liquid crystal display panel 430 in the horizontal direction is ½ of the length of the pixel of the first liquid crystal display panel 410 in the horizontal direction, the resolution of the first liquid crystal display panel 420 is twice of the resolution of the first liquid crystal display panel 410. When the length of the pixel of the second liquid crystal display panel 430 in the horizontal direction is ⅓ of the length of the pixel of the first liquid crystal display panel 410 in the horizontal direction, the resolution of the first liquid crystal display panel 420 is 3 times of the resolution of the first liquid crystal display panel 410.

In one embodiment, the first polarizer 420 is adhered to the surface of the first liquid crystal display panel 410 which faces the backlight module 400, and the second polarizer 440 is adhered to a surface of the second liquid crystal display panel 430 which is opposite to the side of the second liquid crystal display panel 430 which faces the backlight module 400.

The multi-layer display type and the barrier type implemented by the stereoscopic display device 40 of the present invention will be described in the following.

When the stereoscopic display device 40 implements the first type of application of the multi-layer display, i.e. the depth-fused display technology, the detachable polarizer 450 is detached from the stereoscopic display device 40 and not used. An image being displayed by the second liquid crystal display panel 430 is the same as an image being displayed by the first liquid crystal display panel display 410. By controlling brightness of the image being displayed by the second liquid crystal display panel 430 different from brightness of the image being displayed by the first liquid crystal display panel 410, the image is capable of being displayed in any depth between the first liquid crystal display panel 410 and the second liquid crystal display panel 430 and therefore looks stereoscopic.

When the stereoscopic display device 40 implements the second type of application of the multi-layer display, i.e. the second liquid crystal display panel 430 and the first liquid crystal display panel 410 respectively display a foreground image and a background image, the second type of application of the multi-layer display comprises two situations. The first situation is that brightness of the foreground image is greater than brightness of the background image (i.e. using two polarizers), and the second situation is that brightness of the foreground image is lower than brightness of the background image (i.e. using three polarizers). When the brightness of the foreground image being displayed by the second liquid crystal display panel 430 is set to be greater than the brightness of the background image being displayed by the first liquid crystal display panel 410, only the first polarizer 420 and the second polarizer 440 are required. Accordingly, the detachable polarizer 450 is detached and not used. For instance, the foreground image being displayed by the second liquid crystal display panel 430 shows fishes or coral, and the background image being displayed by the first liquid crystal display panel 410 shows a deep ocean scene. Since the brightness of the foreground image being displayed by the second liquid crystal display panel 430 is greater than the brightness of the background image being displayed by the first liquid crystal display panel 410, the foreground image covers the background image. As a result, the foreground image is stereoscopic when human eyes observe the stereoscopic display device 40.

In contrast, when the brightness of the foreground image being displayed by the second liquid crystal display panel 430 is set to be lower than the brightness of the background image being displayed by the first liquid crystal display panel 410 (i.e. using three polarizers), for instance, the foreground image being displayed by the second liquid crystal display panel 430 shows birds or airplanes, and the background image being displayed by the first liquid crystal display panel 410 shows sky of the day, the detachable polarizer 450 is required to be inserted so that the lights required by the second liquid crystal display panel 430 are provided by the first liquid crystal display panel 410. Therefore, the image combining the birds or airplanes of the foreground image with the sky of the day of the background image is stereoscopic when human eyes observe the stereoscopic display device 40.

Figure 1:
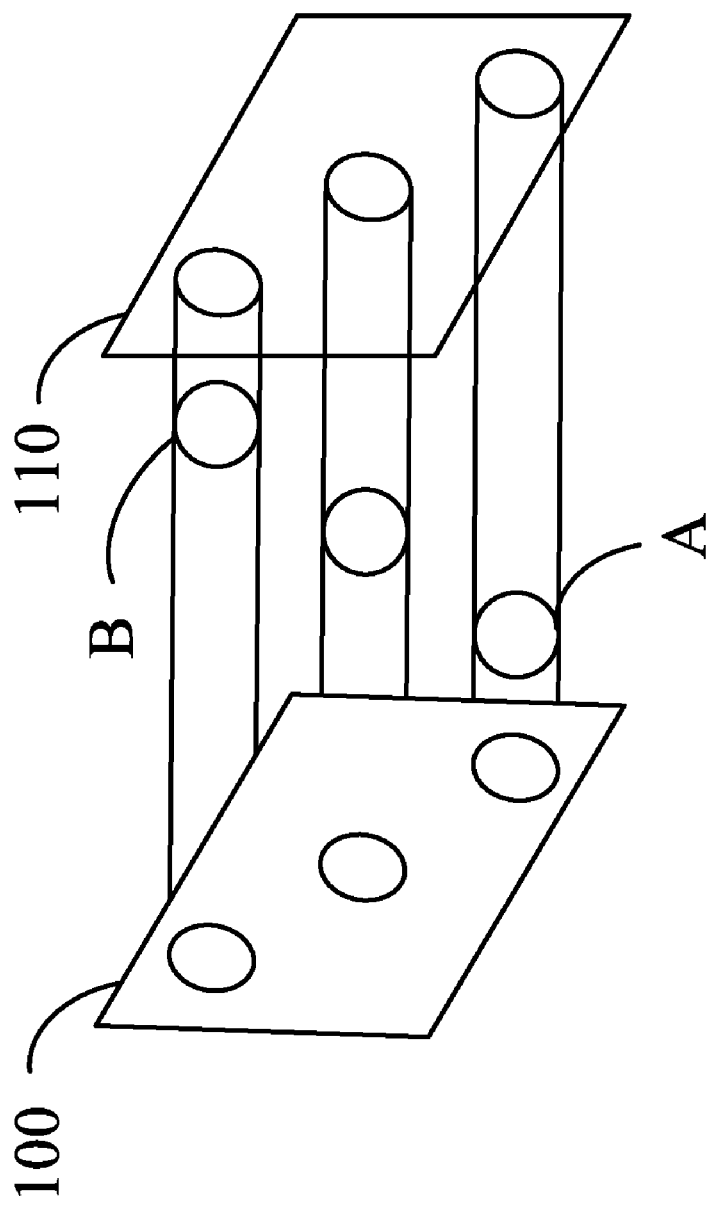
FIG. 1 illustrates the first type of application of the multi-layer display in the prior art.
Figure 1:
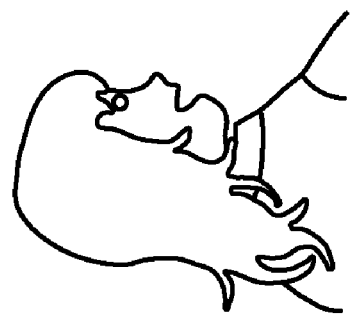
Figure 2:
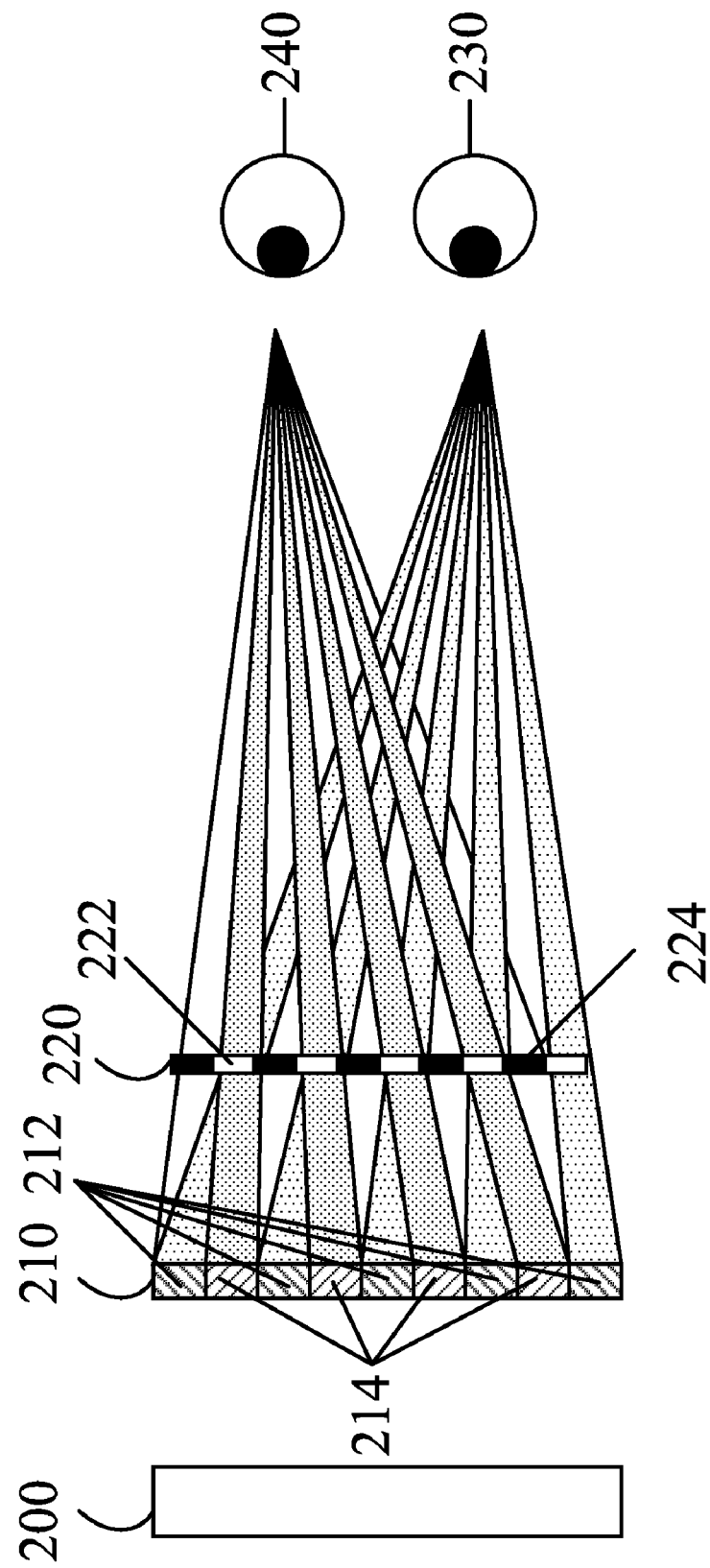
FIG. 2 illustrates the barrier type of the stereoscopic display technology in the prior art.
Figure 3:
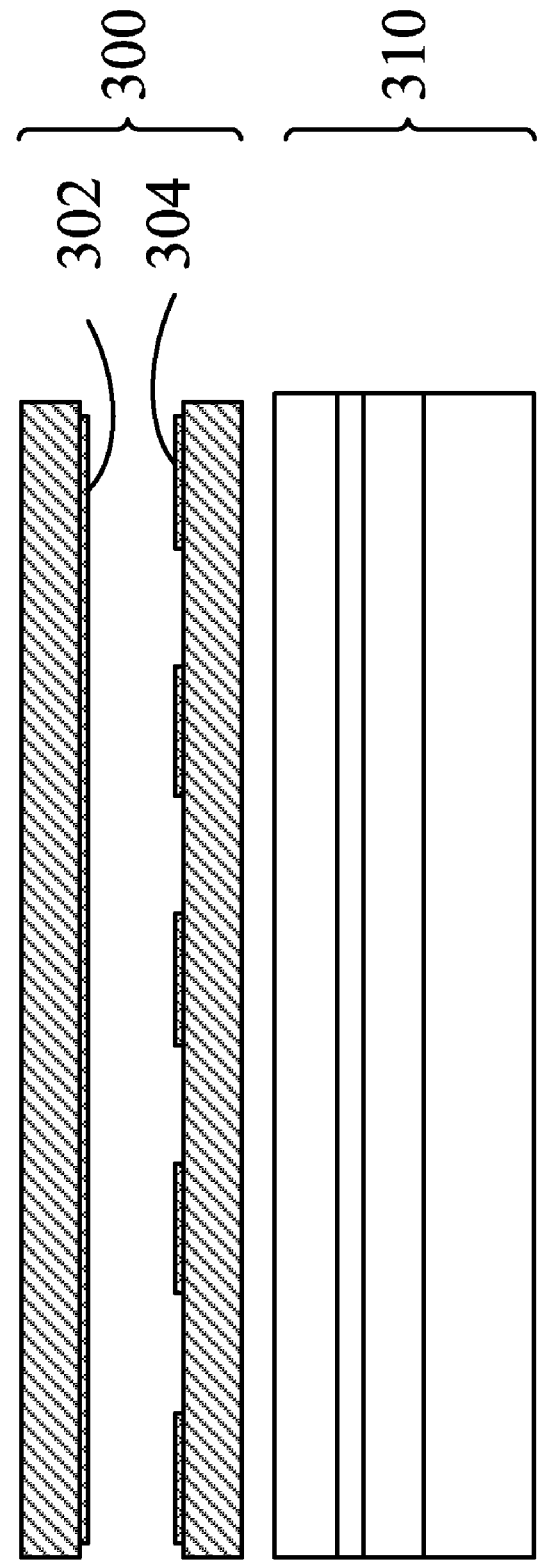
FIG. 3 illustrates the barrier type utilizing two liquid crystal display panel in the prior art.

As aforementioned, when the stereoscopic display device 40 implements the barrier type, the detachable polarizer 450 is required to be inserted between the first liquid crystal display panel 410 and the second liquid crystal display panel. The first liquid crystal display panel 410 displays an image that is interlaced perpendicularly, and the second liquid crystal display panel 430 is served as a barrier and functions as the optical grating 220 in FIG. 2 (described later). That is, the second liquid crystal display panel is utilized for limiting the image being interlaced perpendicularly for the left eye and the right eye so as to generate binocular parallax and therefore the image looks stereoscopic.

Figure 5:
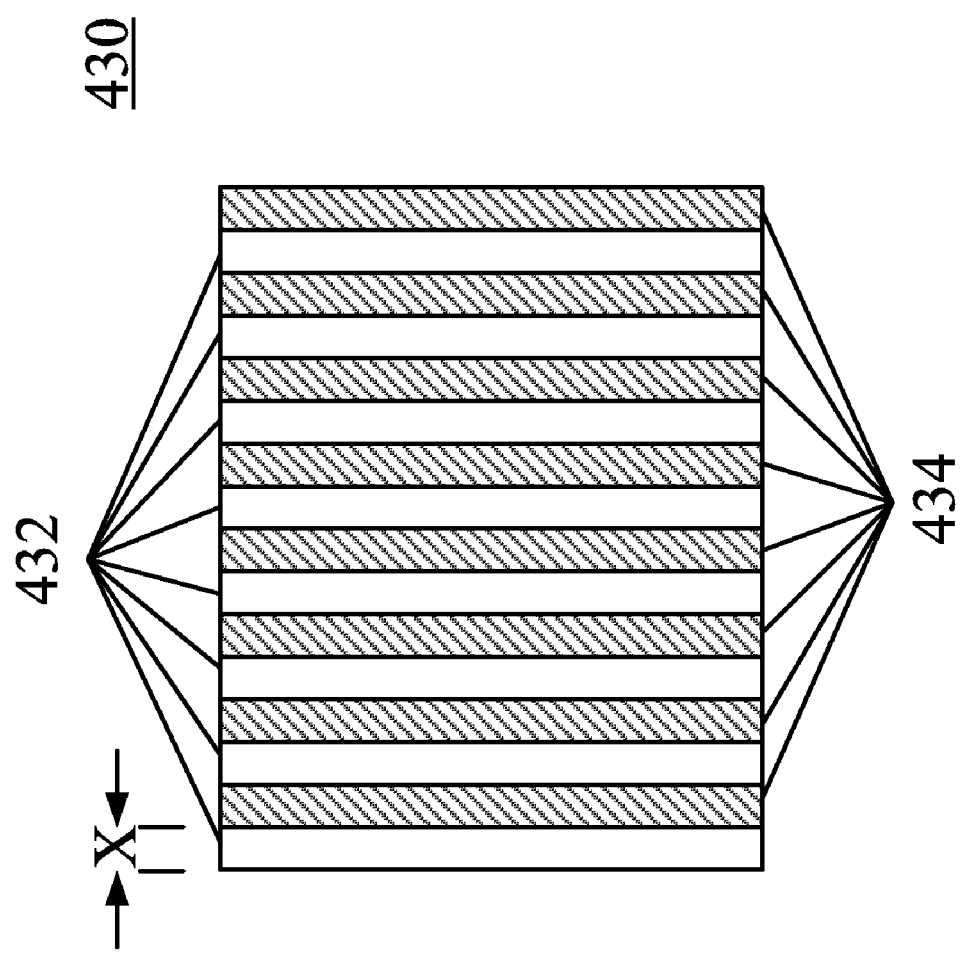
FIG. 5 illustrates the image being displayed by the second liquid crystal display panel served as the barrier.

Please refer to FIG. 5, which illustrates the image being displayed by the second liquid crystal display panel 430 served as the barrier. First areas 432 show a plurality of white strips so as to be served as slits. Second areas 434 show a plurality of black strips so as to be served as barriers. As a result, the second liquid crystal display panel 430 displays the image formed by the black strips and the white strips interlaced perpendicularly. The white strips are all-white images which are mixed by three sub-pixels (red, green, and blue, not shown) of the second liquid crystal display panel 430. The black strips are all-black images which are mixed by the three sub-pixels of the second liquid crystal display panel 430. As mentioned above, the length of the pixel of the second liquid crystal display panel 430 in the horizontal direction (i.e. X) is smaller than the length of the pixel of the first liquid crystal display panel 410 (as shown in FIG. 4) in the horizontal direction. If the length of the pixel of the second liquid crystal display panel 430 in the horizontal direction is equal to the length of the pixel of the first liquid crystal display panel 410 (as shown in FIG. 4) in the horizontal direction, the first areas (served as slits) 432 and the second areas (served as barriers) 434 will fail to limit the image observed by the left eye and the right eye. As a result, the left eye and the right eye will fail to generate binocular parallax and the image will not look stereoscopic. That is, a size of a pixel of a all-white image which is mixed by the three sub-pixels in the second liquid crystal display panel 430 has to be smaller than a size of a pixel in the first liquid crystal display panel 410 (as shown in FIG. 4). In one preferred embodiment, X is in a range from ⅓ to ½ of the length of the pixel of the first liquid crystal display panel 410 in the horizontal direction. That is, the resolution of the first liquid crystal display panel 410 is lower. However, human eyes focus on the foreground image, and therefore the lower resolution of the first liquid crystal display panel will not result in great influence.

In the embodiment of FIG. 5, the second liquid crystal display panel 430 display the black strips and the white strips that are interlaced perpendicularly. The black strips and the white strips function as the optical grating. In another embodiment, the second liquid crystal display panel 430 displays an image formed by a plurality of black grids and a plurality of white grids that are interlaced. The black grids and the white grids function as another type of optical grating capable of implementing the purpose of limiting the images observed by the left eye and the right eye. The first liquid crystal display panel 410 has to display an image which is interlaced by a plurality of grids for the left eye and the right eye corresponding to the first liquid crystal display panel 410, so as to implement the purpose of displaying stereoscopic image.

It is noted that a size of the second liquid crystal display panel 430 has to be equal to or small than a size of the first liquid crystal display panel 410. If the first liquid crystal display panel 410 is larger than the second liquid crystal display panel 430, there will be some areas that are not overlapped by the first liquid crystal display panel 410 and the second liquid crystal display panel 430. Accordingly, a part of the image that is displayed by the first liquid crystal display panel 410 does not pass through the second liquid crystal display panel 430 and accordingly does not look stereoscopic. In addition, a size of the detachable polarizer 450 may be equal to or ½ of the size of the second liquid crystal display panel 410. When the size of the detachable polarizer 450 is ½ of the size of the second liquid crystal display panel 410 and the detachable polarizer 450 is inserted, the detachable polarizer 450 is corresponding to a left half part or a right half part of the second liquid crystal display panel 430. As a result, one half of the stereoscopic display device 40 may display stereoscopic display technology requiring the detachable polarizer 450, and the other half of the stereoscopic display device 40 may display stereoscopic display technology without using the detachable polarizer 450.

In conclusion, the stereoscopic display device 40 of the present invention is capable of implementing the multi-layer display type and the barrier type by detaching/inserting the detachable polarizer 450 and by limiting the pixel scale relationship between the first liquid crystal display panel 410 and the second liquid crystal display panel 430. When the detachable polarizer 450 is detached and not used, the stereoscopic display panel 40 is capable of implementing the type of depth-fused display of the multi-layer display application and the design using two polarizers (the brightness of the foreground image is greater than the brightness of the background image). When the detachable polarizer 450 is inserted and used, the stereoscopic display panel 40 is capable of implementing the design using three polarizers (the brightness of the foreground image is lower than the brightness of the background image) and the barrier type. Concerned with the barrier type, the length of the pixel of the second liquid crystal display panel 430 in the horizontal direction is smaller than the length of the pixel of the first liquid crystal display panel 410 in the horizontal direction.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A stereoscopic display device, comprising:
   a backlight module, having a light emitting side;
   a first liquid crystal display panel, disposed at the light emitting side of the backlight module;
   a first polarizer, disposed at a side of the first liquid crystal display panel which faces the backlight module;
   a second liquid crystal display panel, disposed at a side of the first liquid crystal display panel opposite to the side which faces the backlight module;
   a second polarizer, disposed at a side of the second liquid crystal display panel which is opposite to a side of the second liquid crystal display panel which faces the backlight module; and
   a detachable polarizer, detachably inserted between the first liquid crystal display panel and the second liquid crystal display panel;
   wherein an absorption axis of the first polarizer is parallel to an absorption axis of the second polarizer, an absorption axis of the detachable polarizer is perpendicular to the absorption axis of the first polarizer and the absorption axis of the second polarizer, and a length of a pixel of the second liquid crystal display panel in a horizontal direction is smaller than a length of a pixel of the first liquid crystal display panel in the horizontal direction.

2. The stereoscopic display device of claim 1, wherein the length of the pixel of the second liquid crystal display panel in the horizontal direction is in a range from ⅓ to ½ of the length of the pixel of the first liquid crystal display panel in the horizontal direction.

3. The stereoscopic display device of claim 1, wherein when the detachable polarizer is detached, an image being displayed by the second liquid crystal display panel is the same as an image being displayed by the first liquid crystal display panel, and brightness of the image being displayed by the second liquid crystal display panel is different from brightness of the image being displayed by the first liquid crystal display panel.

4. The stereoscopic display device of claim 1, wherein when the detachable polarizer is detached, an image displayed by the second liquid crystal display panel is different from an image displayed by the first liquid crystal display panel, and brightness of the image displayed by the second liquid crystal display panel is greater than brightness of the image being displayed by the first liquid crystal display panel.

5. The stereoscopic display device of claim 1, wherein when the detachable polarizer is inserted, an image displayed by the second liquid crystal display panel is different from an image displayed by the first liquid crystal display panel, and brightness of the image displayed by the second liquid crystal display panel is lower than brightness of the image displayed by the first liquid crystal display panel.

6. The stereoscopic display device of claim 1, wherein when the detachable polarizer is inserted, the first liquid crystal display panel displays an image that is interlaced perpendicularly, and the second liquid crystal display panel displays an image formed by a plurality of black strips and a plurality of white strips that are interlaced perpendicularly.

7. The stereoscopic display device of claim 1, wherein when the detachable polarizer is inserted, the first liquid crystal display panel displays an image that is interlaced in a grid shape, and the second liquid crystal display panel displays an image formed by a plurality of black grids and a plurality of white grids that are interlaced.

8. The stereoscopic display device of claim 1, wherein a size of the second liquid crystal display panel is equal to a size of the first liquid crystal display panel.

9. The stereoscopic display device of claim 8, wherein a size of the detachable polarizer is equal to the size of the second liquid crystal display panel.

10. The stereoscopic display device of claim 8, wherein a size of the detachable polarizer is ½ of the size of the second liquid crystal display panel.

11. The stereoscopic display device of claim 10, wherein when the detachable polarizer is inserted, the detachable polarizer is corresponding to a left half part or a right half part of the second liquid crystal display panel.

12. The stereoscopic display device of claim 1, wherein a size of the second liquid crystal display panel is smaller than a size of the first liquid crystal display panel.

13. The stereoscopic display device of claim 12, wherein a size of the detachable polarizer is equal to the size of the second liquid crystal display panel.

14. The stereoscopic display device of claim 12, wherein a size of the detachable polarizer is ½ of the size of the second liquid crystal display panel.

15. The stereoscopic display device of claim 14, wherein when the detachable polarizer is inserted, the detachable polarizer is corresponding to a left half part or a right half part of the second liquid crystal display panel.

* * * * *